Figure 1:
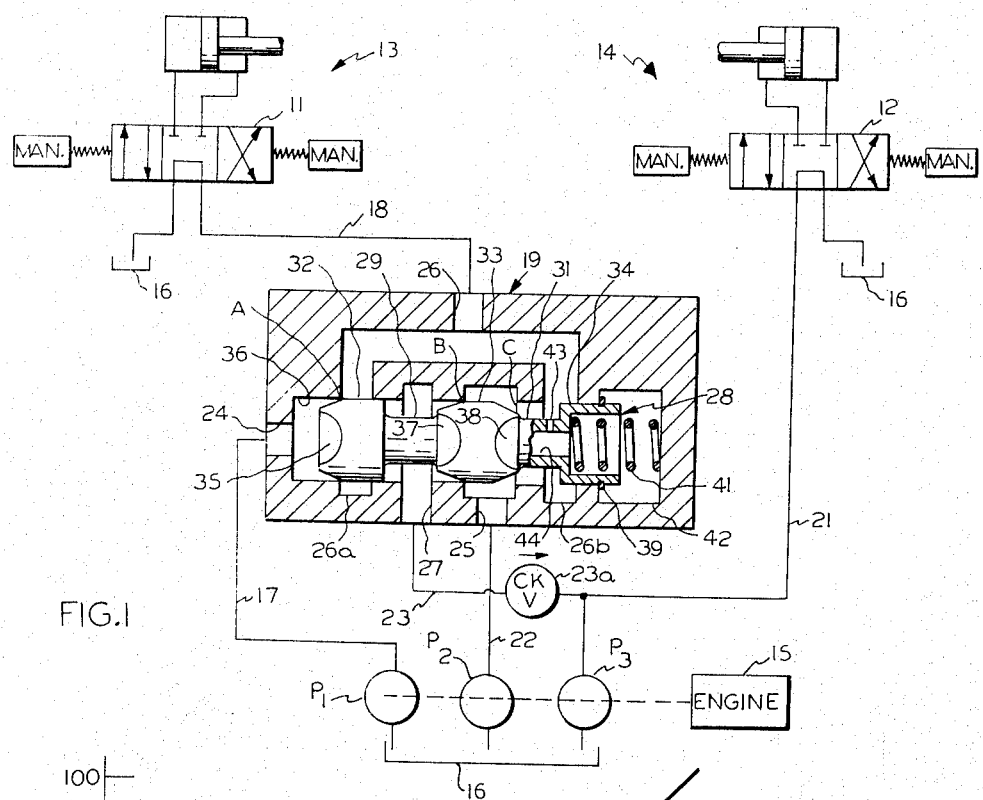

Dec. 5, 1967  T. J. MALOTT  3,355,994

HYDRAULIC SYSTEM

Filed Jan. 13, 1966

INVENTOR
THOMAS J. MALOTT

BY Dodge and Sons

ATTORNEYS

United States Patent Office 3,355,994
Patented Dec. 5, 1967

3,355,994
HYDRAULIC SYSTEM
Thomas J. Malott, Kalamazoo, Mich., assignor to The New York Air Brake Company, a corporation of New Jersey
Filed Jan. 13, 1966, Ser. No. 520,536
2 Claims. (Cl. 91—412)

This invention relates to hydraulic systems for supplying fluid to the implement and steering circuits used on construction vehicles, such as articulated loaders.

Most vehicles of this kind in use today employ completely separate hydraulic systems for operating the steering mechanism and the implements. Each system includes a fixed displacement pump which is driven by the propulsion engine, and an open center directional control valve. The implement pump usually is two to three times larger in displacement than the steering pump, and, at times when the implements are idle, it merely circulates oil through the directional control valve and thereby converts its available energy to heat. I have studied the work cycles of rubber tired articulated loaders equipped with torque converters and find that, in the typical case, little if any work is done by the implement circuit at engine speeds below about 70% of the high idle speed. In view of this, it will be evident that the implement system wastes a considerable amount of energy.

The steering system in this prior arrangement also presents a problem because the output of the steering pump varies directly with engine speed, and, as known in the art, the steering valve should be supplied with a substantially constant rate of flow. One proposed solution to this problem consists in adding a by-pass type flow control valve to the system, but this proposal generally is unsatisfactory in large circuits, i.e., those requiring flow rates greater than 20 gallons per minute. This is so because the speed range of the engine is so large that a pump sized to provide adequate flow at low idle speed has an output many times greater than that desired when the engine is operating at high idle speed. In many cases, the ratio of maximum to minimum output is as great as four to one. Since any flow above the desired value is bypassed to tank at full system pressure, it is evident that the system can easily overheat and, in any event, that it wastes energy. Normally overheating and power drain are so great that the vehicle designers ignore the flow control approach and, in lieu thereof, compromise in selecting the capacity of the steering pump. As a result, the vehicle usually has very slow or sluggish steering at low engine speed and sharp steering at high speed.

The problems of the independent systems approach can be reduced to some extent by interconnecting the steering and implement systems through a flow dividing valve which, in response to engine speed, switches the output of the implement pump back and forth between the two demands. At low engine speed, this valve delivers the total output of the implement pump to the steering system so that sharp steering can be realized without the necessity for using a large steering pump. As the engine accelerates, progressively increasing portions of the output of the implement pump are metered to the implement system with the result that the total flow to the steering valve is maintained substantially constant. Finally, at the high engine speeds at which the steering pump by itself can supply the steering demands, the entire output of the implement pump is diverted to the implement circuit. Although this integrated systems approach cures some of the defects of the independent systems approach, it too has disadvantages. First, as in the case of the independent systems approach, the implement pump necessarily must be quite large and therefore expensive. Second, since the entire output of the implement pump is delivered to the steering system at low speeds, the operator of the vehicle is precluded from moving the implement at this time. Obviously, this is not a safe condition. Finally, since all of the flow to the implement system passes through the flow dividing valve and, except at high speeds, this flow is metered, it is evident that the pressure losses of this scheme are fairly high.

The object of the present invention is to provide an improved integrated supply system which eliminates the disadvantages noted above. According to this invention, the supply system includes three pumps, namely, a steering pump and an implement pump which deliver fluid only to the steering and implement valves, respectively, and a third pump, which I shall call a switch pump, whose output is delivered to either or both of the control valves through the flow divider valve. At low speeds, the outputs of the steering pump and the switch pump are combined to satisfy the full demand of the steering circuit, and at high speeds the outputs of the switch pump and the implement pump are combined to satisfy the full demand of the implement circuit. At intermediate speeds, the output of the switch pump is metered to both circuits in such proportions that the total flow rate to the steering valve is maintained substantially constant. The maximum flow rate to the implement circuit can be the same as in the prior systems first mentioned, but, since it is produced by two small pumps rather than one large pump, the new system is inherently less expensive. Furthermore, since the implement pump in the improved system continuously delivers fluid to the implement circuit, the vehicle operator always is able to move the implement. Finally, since the flow divider now is required to meter only a fraction of the total flow which can be delivered to the implement circuit, it should be apparent the present invention effects a substantial reduction in energy losses.

Figure 2:
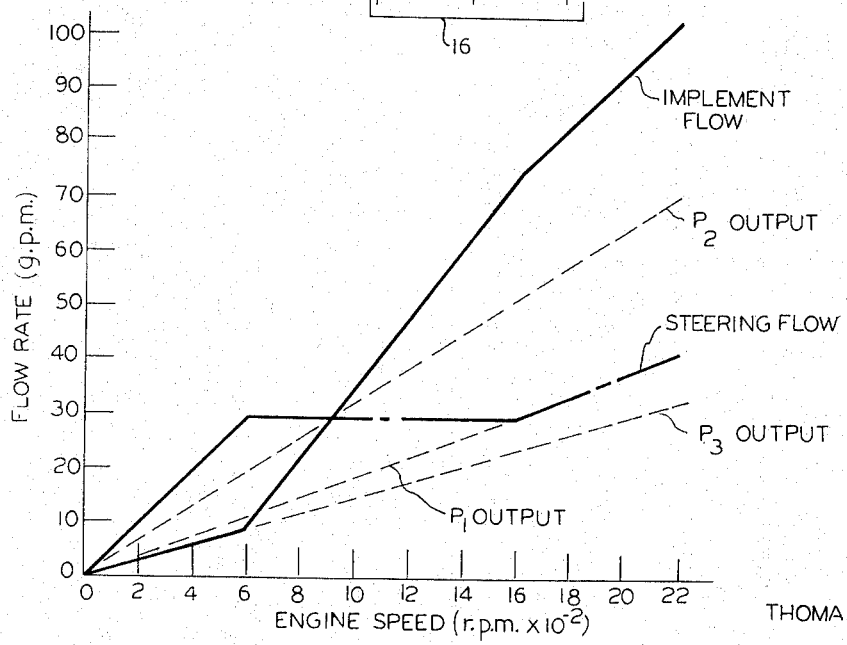

The preferred embodiment of the invention is described herein with reference to the accompanying drawing in which:

FIG. 1 is a schematic diagram of the improved system.
FIG. 2 is a graph illustrating the operating characteristics of a typical system.

Referring to FIG. 1, the improved system is arranged to supply fluid to the open center directional control valves 11 and 12 of the steering and implement circuits 13 and 14, respectively. The system includes three fixed displacement pumps $P_1$, $P_2$ and $P_3$, normally of the gear type, which are driven by the vehicle's propulsion engine 15 and which draw fluid from the common reservoir or tank 16 to which the valves 11 and 12 exhaust. The output of pump $P_1$ is delivered continuously to the control valve 11 through conduits 17 and 18 and the flow dividing valve 19, and the output of pump $P_3$ is delivered continuously to the implement valve 12 through conduit 21. The switch pump $P_2$, on the other hand, is connected with dividing valve 19 through conduit 22 and, depending upon the speed of engine 15, its output is delivered to either or both of the valves 11 and 12 through conduit 18 or conduits 23 and 21. A check valve 23a, located in conduit 23, prevents bleed off of pressure from the implement circuit in the event a major leak develops in either the steering circuit or the conduits connected with it.

Although flow dividing valve 19 can take various forms, the drawing illustrates schematically the one described and claimed in copending application Ser. No. 338,176, filed Jan. 16, 1964. This valve includes primary and secondary inlet passges 24 nd 25 which are connected with conduits 17 and 22, respectively, primary and secondary outlet passages 26 and 27 which are connecten with conduits 18 and 23, respectively, and a reciprocable valve spoolt 28. The valve spool 28 is formed with two annular peripheral grooves 29 and 31 which define three lands 32–34. At its left side, land 32 is provided with four, equispaced, inclined flats 35 which, with the wall of spool bore 36, define a variable area orifice A that is interposed between primary inlet 24 and the branch 26a of primary outlet 26. The opposite sides of land 33 are provided with similar flats 37 and 38 which, again with the wall of bore 36, define variable area orifices B and C located, respectively, between passages 25 and 27 and between passage 25 and the branch 26b of passage 26. Valve spool 28 is biased to the left to the illustrated position, in which snap ring 39 abuts a wall of the valve housing, by a coil compression spring 41. In that position, the flow areas of orifices A and B are a minimum, which in the case of orifice B is zero, and the flow area of orifice C is a maximum. The valve spool 28 is shifted to the right by the pressure differential created by orifice A; the upstream pressure in passage 24 acting directly upon the left end of spool 28, and the downstream pressure being transmitted to the chamber 42 at the closed end of bore 36 through restricted passage 43 and axial bore 44 and acting upon the right end of the spool. As spool 28 moves to the right, the flow areas of orifices A and B increase progressively and the flow area of orifice C decreases progressively. When spool 28 is in its extreme rightward position, the flow area of orifice C is zero. It is desired that there be a linear relationship between the position of spool 28 and the flow rate through orifice A. This can be accomplished by using a spring 41 which has a linear rate, i.e., the force it exerts varies with the first power of its deflection, because the area of orifice A varies directly with flow rate.

In the case of a typical articulated loader, the low and high idle speeds of the engine 15 are 600 and 2200 r.p.m., respectively, the implement circuit 14 does most of its work at speeds above about 1800 r.p.m., and the steering circuit is designed for a supply rate of 30 g.p.m. At engine speeds below 600 r.p.m., the pressure differential produced by the flow through orifice A is inadequate to overcome the closing bias of spring 41 and, therefore, valve spool 28 remains in its illustrated position. As a result, the full output of switch pump $P_2$ flows through conduit 22, passage 25, orifice C, and passage 26b to primary outlet passage 26 where it joins the output of pump $P_1$, and the combined flow is then delivered to the steering valve 11 via conduit 18. The full output of pump $P_3$, on the other hand, is delivered exclusively to implement valve 12 via conduit 21.

At an engine speed of 600 r.p.m., the combined outputs of pumps $P_1$ and $P_2$ equal the desired steering flow rate of 30 g.p.m. Therefore, orifice A and spring 41 are so designed that, as the engine accelerates from this speed, the pressure differential created by the flow from pump $P_1$ shifts valve spool 28 to the right and opens orifice B. Now some of the fluid discharged by switch pump $P_2$ is diverted to the implement circuit through orifice B, passage 27 and conduits 23 and 21. The amount of fluid so diverted increases progressively with engine speed and is so regulated by valve 19 that the rate of supply to steering valve 11 remains substantially constant at 30 g.p.m. (see FIG. 2). In the example under discussion, the flow dividing valve 19 continues to perform this regulating function until the engine reaches a speed of 1600 r.p.m. Since most steering operations, and usually all of the operations requiring maximum flow rate, are performed at engine speeds between 600 and 1600 r.p.m., the supply system affords optimum steering characteristics at a time when such characteristics are needed most.

When the speed of engine 15 reaches 1600 r.p.m., the flow rate through orifice A will be sufficient to produce the pressure differential required to shift valve spool 28 to its extreme rightward position. Therefore, at this time, orifice C will be closed and the entire output of switch pump $P_2$ will be diverted to the implement circuit. It is important that this switchover function be completed before engine speed reaches 1800 r.p.m. in order to avoid energy losses due to metering, and to insure that the implement circuit will receive the maximum supply rate at times when its maximum effort is required.

As engine speed decreases, spring 41 will shift valve spool 28 to the left to reopen orifice C and again cause valve 19 to meter flow to the two demand circuits. When the engine speed reaches 600 r.p.m., valve spool 28 will have returned to the illustrated position so that the full output of pump $P_2$ will again be fed to the steering circuit.

From the preceding discussion it should be evident that, since the implement circuit receives some fluid whenever engine 15 is running the vehicle operator always is able to move the implement. While, as is evident from FIG. 2, the implement flow rate is relatively small at low engine speeds, this is immaterial because the major demands on this circuit occur at speeds above 1800 r.p.m.

Although, in the example of FIG. 2, the capacity of pump $P_1$ equals the desired steering flow rate of 30 g.p.m. at the switchover speed of 1600 r.p.m., this is not a critical requirement. In fact, it may well be that in many installations the output of pump $P_1$ will be less than the desired steering flow rate at switchover speed. This is not a disadvantage because at this high engine speed the steering operations usually are so gentle that the steering circuit demands are far below the regulated value of 30 g.p.m. Thus, if there is a dip in the steering flow curve at switchover speed, this will not be apparent to the vehicle operator.

As stated previously, the drawing and description relate only to the preferred embodiment of the invention. Since changes can be made in the structure of the components used in this embodiment without departing from the inventive concept, the following claims should provide the sole measure of the scope of the invention.

What I claim is:
1. An integrated hydraulic system for a vehicle having a propulsion engine comprising
   (a) a reservoir;
   (b) three pumps connected to draw fluid from the reservoir and driven by the engine;
   (c) a steering circuit and an implement circuit;
   (d) conduit means establishing continuous communication between the first pump and the steering circuit;
   (e) conduit means establishing continuous communication between the second pump and the implement circuit; and
   (f) means responsive to the speed of the engine for connecting the third pump with the steering circuit when the engine is running below a first predetermined speed, for diverting a progressively increasing portion of the output of the third pump to the implement circuit as the engine accelerates from said first speed to a second predetermined speed, and for disconnecting the third pump from the steering circuit when the engine is running at a speed above said second speed.

2. An integrated hydraulic system as defined in claim 1 wherein said second predetermined speed is below the speed range in which the implement circuit performs most of its work.

References Cited
UNITED STATES PATENTS

| | | | |
|---|---|---|---|
| 2,103,530 | 12/1937 | Henry | 60—52 X |
| 2,353,388 | 7/1944 | Cannon | 60—97 X |
| 2,353,389 | 7/1944 | Cannon | 60—97 X |

EDGAR W. GEOGHEGAN, *Primary Examiner.*